Oct. 2, 1934.      R. B. FAGEOL      1,975,202
MULTIWHEEL ROAD VEHICLE
Filed Feb. 13, 1928      2 Sheets-Sheet 1
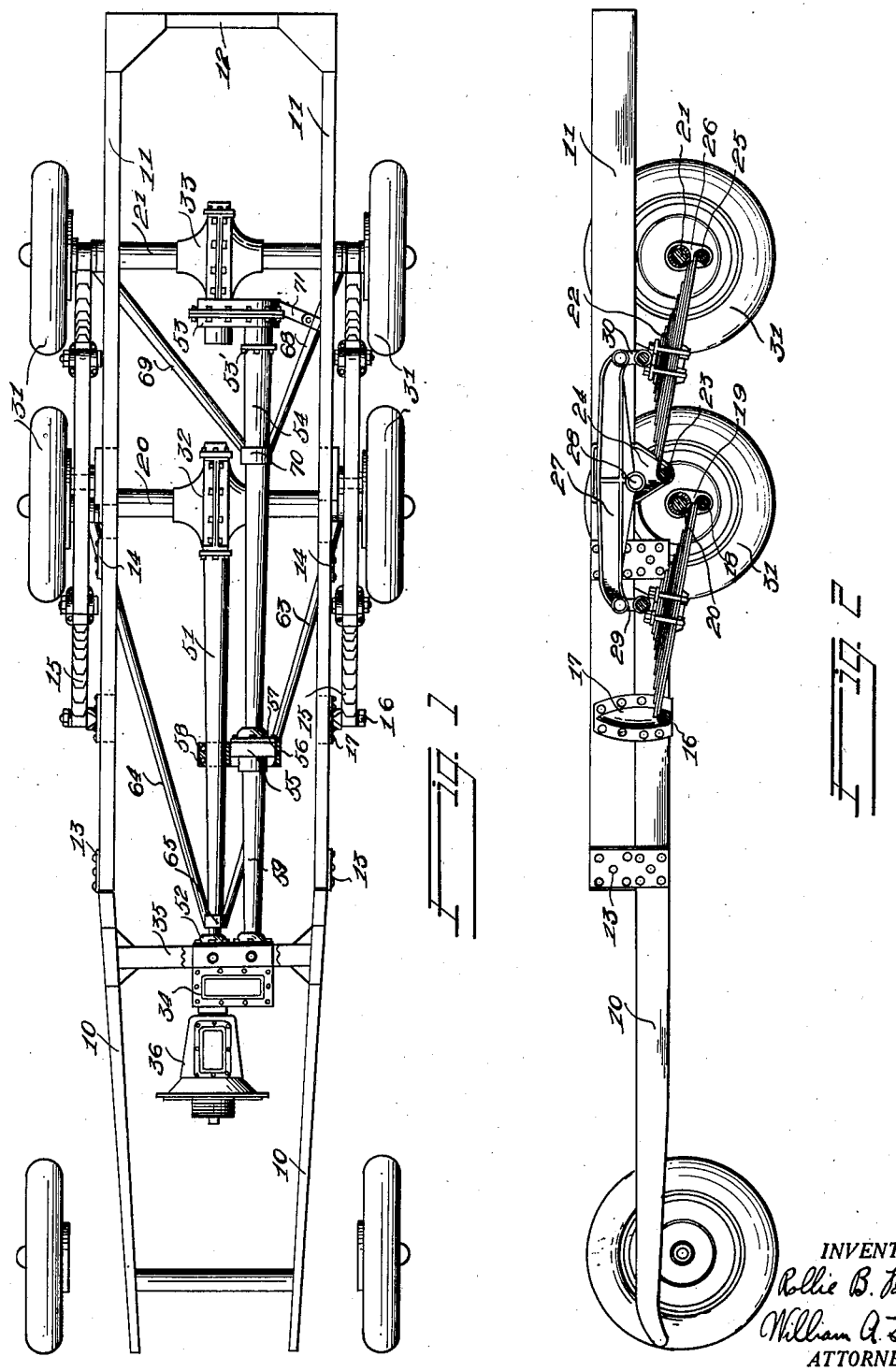
INVENTOR.
Rollie B. Fageol
William A. Strauch
ATTORNEYS.

Oct. 2, 1934.     R. B. FAGEOL     1,975,202
MULTIWHEEL ROAD VEHICLE
Filed Feb. 13, 1928     2 Sheets-Sheet 2
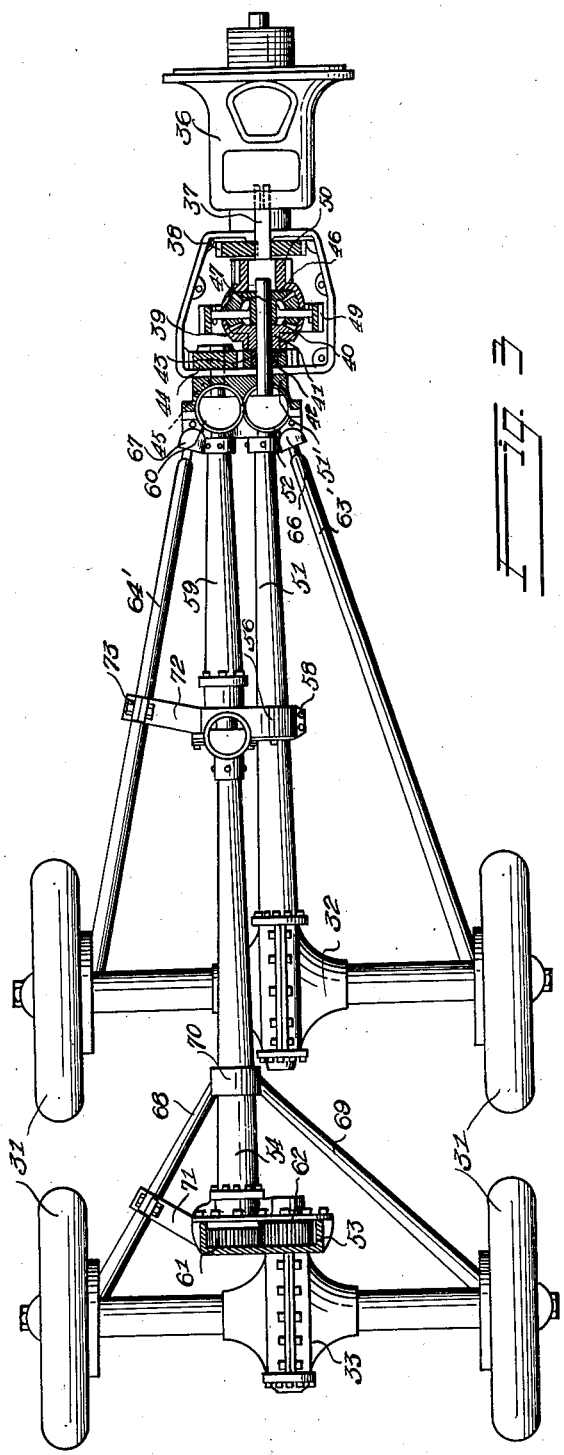
INVENTOR.
Rollie B. Fageol
William A. Strauch
ATTORNEYS.

Patented Oct. 2, 1934

1,975,202

UNITED STATES PATENT OFFICE 1,975,202

MULTIWHEEL ROAD VEHICLE

Rollie B. Fageol, Los Angeles, Calif., assignor, by mesne assignments, to Automotive Engineering Corporation, a corporation of Delaware Application February 13, 1928, Serial No. 254,097

15 Claims. (Cl. 180—22)

This invention relates to a road vehicle embodying more than two axles. Preferably the vehicle includes a single forward axle and two axles arranged relatively close together adjacent the rear end of the frame but as will be obvious to those skilled in the art the principles thereof are applicable to vehicles having more than one front axle. The invention is intended particularly for use in trucks though it may obviously be used in connection with motor busses or bodies of other types.

The primary purpose of the invention is to provide a novel multi-wheel road vehicle constructed from a standard commercial chassis by the addition thereto of an extension to the frame beneath which axles arranged relatively closely together are arranged.

A further object of the invention is to utilize standard parts of the commercial car in the construction of the multi-wheel vehicle wherever possible, so that the conversion from a two axle vehicle to a three axle vehicle may be readily accomplished.

A further object of the invention is to provide a simple driving arrangement to differentially drive the differentials of the drive axles, which driving arrangement is built up largely of duplicate parts of the standard two axle car whereby a minimum number of special parts are required in order to convert a two axle truck into a three axle vehicle, or in order to build four axle vehicles with a minimum of special parts.

A still further object of the invention is to provide a simple arrangement for extending the frame of the two axle vehicle to provide a vehicle having a low center of gravity, the extension of the frame of the vehicle being offset with respect to the usual frame providing a space therebeneath for several driven axles.

Still another object of the invention is to provide a road vehicle having two driven axles that are attached to the frame by springs that are so connected to the axles that the free deflection thereof is permitted as the axles pass over the road irregularities, and in which the reactions due to the driving torque imposed on the several driven axles are effectively resisted without substantial interference with the necessary movements of the axles.

Still further objects of the invention will appear as a description thereof proceeds with reference to the accompanying drawings in which:

Fig. 1 is a plan view of the chassis of a road vehicle constructed in accordance with this invention, the forward portion of the vehicle being shown merely in outline.

Fig. 2 is a side view of the parts shown in Fig. 1.

Fig. 3 is a plan view partly in section of a slight modification of the construction shown in Fig. 1.

Like reference characters indicate like parts throughout the several figures.

The invention is shown applied to the conversion of an ordinary Ford two axle truck into a truck or similar vehicle having three axles, by the addition of a second drive axle. The drive axles are arranged relatively close together beneath an extension of the frame of the ordinary two axle vehicle. In the embodiment of the invention standard Ford parts are used wherever possible, though their relation to each other is, in some respects and some cases, different from that used in the standard Ford construction.

The numeral 10 indicates the longitudinal frame members of the chassis of a Ford or a similar standard automobile. The frame is lengthened in order to form the vehicle of this application by superposing upon the rear ends of the longitudinal members 10, parallel frame members 11, that are connected at their rear end by a transverse member 12. As clearly shown in Fig. 2 the members 11 overlie the members 10 throughout a substantial portion of the length of both members and said members are rigidly connected together in lapped relation at a plurality of widely spaced points by plates 13 and 14 that are riveted to said members as clearly shown in Fig. 2. By this arrangement the auxiliary frame consisting of the members 11 and 12 provides in effect, a kick-up in the chassis frame in which the driven axles are positioned. This arrangement also provides in the overlapped members 10 and 11 a practical and inexpensive frame construction of great strength between the front and rear axles, where strength is required.

The foremost axle of the two rear axles is connected to the frame just described by means of a pair of laminated springs 15 that are pivotally connected at 16 to brackets 17 rigidly secured to the chassis frame. The other end of each of the springs 15 is connected by means of a pin 18 to a shackle or hanger 19 that is suspended from the axle 20. The hanger 19 is pivoted to the axle 20 or if desired, a universal joint may be used to connect said hanger to the axle. The springs 15 are, preferably, standard Ford cantilever springs applied lengthwise of the frame rather than transversely thereof.

The rear axle 21 is similarly connected to the chassis frame by a pair of springs 22 pivoted at one end at 23 to brackets 24 rigidly secured to the frame members 11 and projecting downwardly therefrom to bring the pivot 23 substantially in the horizontal plane of the pivot 16. The other end of each of the springs 22 is pivotally connected at 25 to a hanger 26 that is suspended from the axle 21. The hanger 26 may be journalled on said axle or it may be connected thereto by a universal joint whereby the axle is free to tilt in a vertical transverse plane without imposing twisting stresses on said hangers.

In order to equalize the load on the several axles an equalizing beam 27 is pivoted at 28 at each side of the frame. Each beam 27 extends to a point substantially midway between the ends of the springs 15 and 22 and is shackled to the mid portion of said springs by shackles 29 and 30 (Fig. 2). In this manner forces, applied to the ends of the springs 15 and 22 that are suspended from the axles, are transmitted to the equalizing beam 27, causing said beam to rock upon its pivot 28 thus transferring the shock to the other spring on the same side of the vehicle.

The axles 20 and 21 are each supported on a pair of wheels 31, said wheels being operatively connected to driven shaft sections arranged within the axles 20 and 21, which sections are differentially driven by differentials arranged in the housings 32 and 33. This construction is the standard differential drive and the details thereof are not described here. It may be noted however, that the construction of the axles 20 and 21, the wheels carried thereby, and the mechanism included in the housings 32 and 33 are identical and are preferably of the type furnished for the drive axles of the ordinary standard two axle truck.

In order to differentially drive the two driven axles and in order to provide additional speeds at which the vehicle may be driven, an auxiliary two speed transmission and differential mechanism is included in the housing 34 (Fig. 1). Preferably, but not necessarily, the housing for this differential and transmission mechanism is supported on a transverse member 35 rigidly secured at its ends to the frame members 10. Said transverse member is supported in such position that the auxiliary transmission and differential mechanism will be supported immediately adjacent the standard three speed transmission mechanism included in the housing 36, so that the weight thereof is not unsprung. The shaft 37 of the ordinary three speed transmission has keyed to the end of it a gear 38 within housing 39 for the differential and two speed auxiliary transmission. Arranged within the housing 39 is a differential mechanism 40 of usual form, one bevel gear 41 of which is provided with a sleeve 42 carrying a spur pinion 43 that meshes with a spur gear 44 carried on the drive shaft 45 for the rear axle. The other bevel gear 46 of the differential 40 has keyed to it a shaft 47 that extends through the sleeve 42 and is connected by a universal joint to the drive shaft for the forward of the two driven axles. In this way the several driven axles are differentially driven by the differential gear 40.

The power is transmitted to the differential 40 from the gear 38 above referred to by a gear meshing therewith on a countershaft arranged below said gear. Said countershaft carried gears (not shown) mesh with the external gears 49 and 50 that are a part of the differential housing of differential 40. A suitable sliding clutch serves to selectively clutch one of the gears that is in mesh with the gears 49 and 50 to the countershaft so that the differential 40 may be driven at one or the other of the two speeds depending upon whether the differential 40 is driven by the gear 50 or by the gear 49.

The housing 32 of the forward driven axle is connected to the housing 34 by a torque tube 51 that is rigidly bolted at one end to the housing and is connected at its other end to a bracket 51' by means of a universal joint 52 to the housing 34, this construction being the same as that used on the Ford automobile. The drive shaft for this axle extends through the torque tube 51 and is connected to the shaft 47 by a universal joint, the center of which is roughly coincident with the center of the universal joint, by which the torque tube is connected to the housing 34.

The differential housing 33 has secured to it a housing 53 extending laterally of said housing. Said housing has bolted to it as 53' a torque tube 54 that is of the same size and form as the torque tube 51 before referred to. The universal joint 55 of said tube is mounted in a casting 56 that is provided with a ball face 57 so that limited universal movement is permitted between this end of the torque tube and said casting. The casting 56 is split and is clamped on the torque tube 51 by bolts 58. A relatively short torque tube 59 is connected to the end 55 of the torque tube 54 at one end and is connected by a universal joint 60 to the bracket 51' carried by casing 34.

The drive shaft 45 for the rear axle extends through the torque tubes 59 and 54 and is provided with a universal joint, the center of which is roughly coincident with the universal joint formed between the end 55 and spherical surfaces 57, the center of which is also approximately located at the center of said last mentioned joint. Said drive shaft carries rigidly secured thereto, a spur pinion 61 meshing with a spur gear 62 carried by the end of the drive shaft for the differential contained in the housing 33.

The forward driven axle is held in position so that its axis is at right angles to the longitudinal axis of the frame by radius rods 63 and 64, each rod being secured at one end to an axle adjacent a wheel and the other end of each of said rods being connected to a sleeve 65 that is rotatable on the torque tube 51, but not free to slide thereon, as shown in Fig. 1, or if desired, the radius rods 63' and 64' may be connected by means of universal joints 66 and 67 to the bracket 51' as shown in Fig. 3. It will be understood that by either of these arrangements the axle 20 is free to tilt in transverse vertical planes as the vehicle passes over uneven roads.

The rear driven axle 21 is similarly held in proper position by radius rods 68 and 69, each of which is attached to the axle at one end and to a sleeve 70 carried by the torque tube 54. The sleeve 70 is free to rotate on said tube, but is not free to move endwise thereof.

In order to resist the torque reaction imposed on the housing 53 by the driving gear 61 mounted therein, an arm 71 is rigidly secured to said housing and to the radius rod 68 in any suitable manner. As shown in Fig. 3, the casting 56 may also be provided with a lateral extension 72 secured at 73 to the radius rod 64'. The radius rods for the forward axle just referred to may be of the standard construction while the radius rods for the rear axle may be adaptations of the radius rods of standard construction to make them fit the slightly different relations in which they are used.

In the operation of the construction above described the power of the motor is transmitted from the standard three speed transmission included in the housing 36 to the differential 40 through gears 49 or 50 carried thereby included in the housing 34, which differential serves to drive the shafts extending through the torque tubes 51 and 54 arranged between the housing 34 and the differential housings 32 and 33 carried by the axles 20 and 21. In this way the differentials individual to these axles are driven so that each of the four driven wheels is differentially driven with respect to every other wheel. In passing over rough roads the axles are free to tilt in vertical planes and the springs 15 and 22 that interconnect said axles to the frame are free to deflect since, when such deflection occurs the hangers 19 and 26 are free to rotate on said axles. At the same time, the position of the several axles transversely of the vehicle is definitely maintained by the torque tubes and the radius rods that serve to hold said axles in proper position while permitting free tilting in vertical planes. The load is distributed to the several axles substantially equally by the equalizing beams 27 connected to the springs and pivoted to the frame in such manner that said equalizing beams serve the further function of transmitting the shocks from one spring to its companion spring at the same side of the vehicle. Inasmuch as the frame extension members are straightened commercial forms and as standard axles, wheels, differentials, drive shafts, torque shafts, and radius rods as well as springs are preferably used in the construction of the vehicle above described, it will be obvious that said vehicle can be built at relatively small expense utilizing in large measure simply additional parts of a standard construction. The parts that must be specially designed are accordingly reduced to a minimum, and the cost of the vehicle correspondingly reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A road vehicle including a standard chassis frame, an extension rigidly secured to the rear end thereof, a pair of driven axles beneath said extension each axle being secured to said frame and extension by a pair of springs each of which is directly pivoted to said frame or extension at one end and connected to an axle at its opposite end by a swingingly mounted hanger, means to distribute the load upon the intermediate portions of said springs and means to hold said axles in definite spaced relation so that movement of each axle relative to the spring ends to which it is connected by said hangers is substantially prevented.

2. A road vehicle including a frame, a pair of driven axles arranged adjacent one end of said frame, each axle being individually secured to said frame by a pair of springs, each of which is directly pivoted to the frame at one end and connected to an axle at its opposite end by a hanger swingingly mounted on the axle, means connecting the mid portions of the springs at the same side of the vehicle to said frame and torque tubes arranged between said axles and frame and serving to substantially prevent movement of each axle toward the springs that connect it to said frame.

3. The combination defined in claim 2 in which said torque tube is connected to said frame by universal joints whereby tilting of each axle in vertical planes is permitted.

4. The combination defined in claim 2 including a pair of radius rods for each axle, each of said rods for each axle being secured to the axle adjacent its connection to the springs individual thereto, the other end of each radius rod being connected to a sleeve that is rotatably mounted so that tilting of the axles is permitted by said radius rods.

5. A road vehicle comprising a frame, a pair of driven axles adjacent one end of said frame, springs interconnecting said axles and frame so that the load is distributed on said driven axles, a separate torque tube extending longitudinally into connection with the housing of each axle, an individual drive shaft for each axle housed within one of said torque tubes, and differential means to drive said drive shafts differentially with respect to each other.

6. A road vehicle comprising a frame, a pair of standard drive axles arranged adjacent one end of said frame, springs interconnecting said axles and said frame, each of said drive axles including a housing and a differential arranged therein, one of said differential housings having secured thereto a gear housing extending laterally of the longitudinal axis of said frame, a torque tube extending from one of said differential housings to said frame and a second torque tube extending substantially parallel to said first named torque tube and secured to said laterally extending housing at one end and flexibly united to said frame at its other end, drive shafts arranged within said torque tubes and operatively connected to the differentials in said axle housings and means to differentially drive said drive shafts.

7. A road vehicle comprising a frame, a standard transmission arranged adjacent the forward end of said frame, an auxiliary transmission and differential mechanism supported on said frame arranged immediately adjacent said standard transmission and operated thereby, a pair of drive axles arranged adjacent the rear end of said frame, springs yieldingly inter-connecting said axles and frame, a drive shaft for each drive axle extending from said differential to said drive axle, said drive shafts being arranged in substantially parallel relation, and torque tubes surrounding said drive shafts, each torque tube being rigidly connected to one of said drive axles at one end and flexibly connected to said frame adjacent said differential at the other end thereof.

8. A road vehicle comprising a frame, a pair of drive axles each including a housing and a differential mechanism in said housing, springs interconnecting said axles and said frame, a transmission arranged adjacent the other end of said frame, a relatively short drive shaft arranged longitudinally of said frame and connected to the differential on one of said drive axles, a second and longer drive shaft spaced laterally from the longitudinal center of said frame and operatively connected at one end to the differential of the other of said drive axles, a differential disposed adjacent said transmission and driven thereby, one of the differentially driven gears being operatively connected to the first named drive shaft and the other of said differential gears being connected to the other of said drive shafts, and means disposed between the ends of the shorter shaft for positioning said longer shaft relative to the latter.

9. A road vehicle comprising a frame, a pair of drive axles each including a housing and a differential mechanism in said housing, springs inter-connecting said axles and said frame, a transmission supported by said frame, a drive shaft arranged longitudinally of said frame and connected to the differential of one of said drive axles, a second drive shaft spaced laterally from the first mentioned drive shaft and operatively connected at one end to the differential of the other of said drive axles, a differential disposed adjacent the transmission and driven thereby, one of the differentially driven gears of said differential being operatively connected to the first named drive shaft, and another of the differential gears being connected to the other of said drive shafts, a torque tube that is flexible between its ends surrounding said second drive shaft, a torque tube receiving the other of said drive shafts, and a bracket inter-connecting said torque tubes adjacent the point at which said first named tube is flexible.

10. A road vehicle comprising a standard chassis frame, an extension for said frame consisting of straight commercial members disposed in overlapped relation to said chassis frame and secured thereto at widely spaced points along the length thereof, drive axles arranged beneath said extension, each axle being connected to the frame or extension by a pair of springs, each spring being directly pivoted to the frame or extension at one end and being connected to the axle at its other end by a hanger depending from said axle and pivotally connected to said spring, means interconnecting the mid portion of said springs and said frame or extension to distribute the load between the axles, and torque resisting means to hold each of said axles from movement endwise of the frame or extension, said torque resisting means being flexibly united to said frame so that tilting of the axles is permitted.

11. The combination defined in claim 10 in which the torque resisting means for each axle comprises a tube that houses the drive shaft for that axle, each drive shaft being provided with a flexible joint that is approximately coincident with the flexible joint in each of said torque resisting tubes.

12. A road vehicle including a frame, a pair of drive axles arranged adjacent one end of said frame, separate drive shafts for said drive axles, one of said shafts being disposed adjacent the longitudinal center of the frame, the other being disposed to one side of said center, a standard transmission disposed centrally of said frame, and a differential supported on said frame adjacent said standard transmission, said differential being aligned with said transmission and aligned with one of said drive shafts, one of the driven gears of the differential being connected to one of said drive shafts and another of the driven gears of said differential being connected to the other of said drive shafts to rotate it in reverse direction from the first named drive shaft, gears disposed adjacent one of said axles to drive said axle from said reverse rotating shaft in the same direction of rotation as the other axle, and a pair of torque tubes housing said drive shaft, said torque tubes extending parallel to each other and rigidly secured at one end to the housing and flexibly secured at their other end to the frame.

13. A road vehicle comprising a frame, a pair of axles disposed adjacent one end of said frame, each axle being connected to said frame by a pair of springs each of which is pivoted to the frame at one end and by torque resisting means also pivotally attached to said frame, said torque resisting means for each axle being rigidly attached to the axle at its other end, each of said springs at the ends opposite to those pivoted to the frame being connected to the axle by hangers depending from said axle and pivoted thereto and to said spring ends, whereby each axle is held in position by said torque resisting means and each spring is permitted free deflection by the shifting of said hangers upon the axles.

14. A road vehicle comprising a frame, tandem axles, each axle being connected individually to said frame by a pair of springs connected to the axle by depending arms pivoted to the axle and to the springs, means to hold each axle from movement bodily endwise of the frame, said means being rigidly attached to the axle at one end and flexibly united to the frame at the other end.

15. The combination defined in claim 14 in which the last mentioned means comprises a torque tube for each axle housing the drive shaft for said axle, and a pair of radius rods for each axle, each radius rod being rigidly secured at one end to an axle adjacent a wheel thereon and being flexibly united at its other end to a torque tube.

ROLLIE B. FAGEOL.